(12) United States Patent  
Bietenhader

(10) Patent No.: US 7,770,843 B2  
(45) Date of Patent: Aug. 10, 2010

(54) ROTORCRAFT SKID UNDERCARRIAGE AND A ROTORCRAFT INCLUDING SUCH AN UNDERCARRIAGE

(75) Inventor: Claude Bietenhader, Lambesc (FR)

(73) Assignee: Eurocopter, Marignane (FR)

( * ) Notice: Subject to any disclaimer, the term of this patent is extended or adjusted under 35 U.S.C. 154(b) by 346 days.

(21) Appl. No.: 11/644,844

(22) Filed: Dec. 26, 2006

(65) Prior Publication Data

US 2007/0181744 A1    Aug. 9, 2007

(30) Foreign Application Priority Data

Dec. 27, 2005  (FR)  ................................. 05 13375

(51) Int. Cl.  
B64C 25/52  (2006.01)  
B64C 25/58  (2006.01)  
B64C 25/00  (2006.01)

(52) U.S. Cl. ................. 244/108; 244/17.17; 244/104 R

(58) Field of Classification Search ................. 244/108, 244/102 R, 100 R, 119, 136, 139, 17.17, 244/17.15, 104 R, 104 LS, 104 CS, 110 R, 244/110 E, 116  
See application file for complete search history.

(56) References Cited

U.S. PATENT DOCUMENTS

| | | | | |
|---|---|---|---|---|
| 3,042,345 | A | * | 7/1962 | Holland, Jr. ............. 244/104 R |
| 4,270,711 | A | | 6/1981 | Cresap et al. |
| 4,645,143 | A | * | 2/1987 | Coffy ......................... 244/108 |
| 5,045,649 | A | * | 9/1991 | Ramsey et al. ............. 244/108 |
| 5,211,359 | A | | 5/1993 | Rene et al. |
| 5,224,669 | A | | 7/1993 | Guimbal |
| 5,860,621 | A | | 1/1999 | Barquet et al. |
| 6,390,413 | B1 | * | 5/2002 | Chiu .......................... 244/139 |
| 2002/0008175 | A1 | | 1/2002 | Howard et al. |
| 2005/0279885 | A1 | * | 12/2005 | Tebon .................... 244/100 R |

* cited by examiner

Primary Examiner—Tien Dinh  
Assistant Examiner—Richard R Green  
(74) Attorney, Agent, or Firm—Young & Thompson

(57) ABSTRACT

The invention relates to a rotorcraft (21) comprising a fuselage (22) and an undercarriage (20) having skids (24, 25) interconnected by at least one cross-member (26, 27), together with connection means for connecting the cross-member to the fuselage and presenting angular stiffness that varies with varying sinking (E) of the undercarriage as a result of contact with the ground (23).

16 Claims, 6 Drawing Sheets

ROTORCRAFT SKID UNDERCARRIAGE AND A ROTORCRAFT INCLUDING SUCH AN UNDERCARRIAGE

The present invention relates to improvements to skid undercarriages for rotorcraft, and to rotorcraft including such an undercarriage.

The technical field of the invention is that of manufacturing helicopters.

BACKGROUND OF THE INVENTION

In addition to allowing a rotorcraft to be maintained in a stable position or to slide on the ground, the undercarriage or landing gear has as its main function that of dissipating at least part of the energy of the impact that is caused by the rotorcraft landing.

This energy is absorbed by friction against the ground, by deformation of the undercarriage, and of its connections with the airframe of the rotorcraft, and where appropriate by shock absorbers. Such deformation is made possible by the parts of the undercarriage being elastic.

The rotorcraft standing on its undercarriage can be thought of as a suspended weight. The resulting mechanical system presents resonant modes of deformation that correspond to resonant frequencies of deformation.

The engine(s) of the rotorcraft, its rotor(s), and the mechanical members for transmitting drive from the engine(s) to the rotor(s), all constitute mechanical excitation sources that produce vibration.

Such vibration can excite said mechanical system in the event of the frequency of the vibration that is produced being close to, or equal to, one of the resonant frequencies of the system: such a situation is referred to as "coupling".

The term "ground resonance" is commonly used to designate instability of a rotorcraft resting on the ground via its undercarriage that can occur during acceleration or deceleration of the main rotor, or while the rotor is close to its nominal speed, and the helicopter is on the ground. This instability can appear at one or more frequencies close to the first (i.e. the lowest) resonant frequency in rolling (or pitching) of the rotorcraft on its undercarriage, whenever the frequency of rotation of the center of gravity of the main rotor (for providing forward drive and lift) about the axis of the rotor is close to these resonant frequencies.

This particular frequency, written F_excit, is related to the frequency of rotation ($\Omega$) of the rotor and to the frequency of oscillation in drag ($\omega\delta$) of the blades of the rotor by the following relationship:

$$F\_excit = \pm\Omega + \omega\delta$$

The first resonant frequency of the suspension (in rolling or in pitching) of the rotorcraft on its undercarriage depends on several parameters, in particular the stiffness and the damping of the undercarriage structure and of its connections with the airframe (or fuselage) of the rotorcraft, on the relative position of the center of gravity of the rotorcraft and bearing points on the ground, on the weight of the rotorcraft, and on its inertia about the axis under consideration.

These parameters, and the corresponding resonant frequency, can vary considerably for a given rotorcraft, as a function of the equipment with which it is fitted and of its on-board load, and also as a function of various modifications made to a given model of aircraft (of rotorcraft) during its life cycle. When the undercarriage is subcritical, no frequency crossing occurs up to nominal speed, but a change in the weight, in the roll inertia, or in the position of the center of gravity can lead to a frequency crossover occurring close to nominal speed, thereby creating coupling that is explosive. A supercritical undercarriage (lower resonant frequencies) is exposed to frequency crossover during acceleration and deceleration, but any increase in weight or inertia moves these frequencies downwards away from the nominal speed. This thus constitutes a solution that is more robust in the face of changes than that provided by a subcritical undercarriage.

With a supercritical skid undercarriage, it is desired that the frequency of the first mode in roll $\omega x$ remains less than the absolute value of the difference between nominal $\Omega$ and $\omega\delta$, which can be written:

$$\omega x < |\Omega - \omega\delta|$$

It is essential to master these phenomena in order to avoid accidents when the rotorcraft is landing or taking off.

Various skid undercarriage configurations have been proposed in attempts to satisfy those constraints, in particular as described in the following patents: FR 1 578 594 and GB 1 205 263, FR 2 372 081 and U.S. Pat. Nos. 4,196,878, 2,641,423, 3,716,208, 4,270,711, 4,519,559, and EP 113 616.

The undercarriages described in those documents are relatively complex and heavy. The undercarriages having ball joints, springs, or dampers, are difficult to modify over time in order to improve the performance of a rotorcraft.

Another unsolved problem is that of providing a skid undercarriage that is relatively unsophisticated while nevertheless reducing the load factor imposed on passengers during landing, as compared with rigid undercarriages.

OBJECTS AND SUMMARY OF THE INVENTION

An object of the invention is to propose a rotorcraft undercarriage having skids interconnected by at least one cross-member that is improved and/or that remedies at least in part the shortcomings or drawbacks of known skid undercarriages.

An object of the invention is also to provide a rotorcraft fitted with such an undercarriage, in particular a rotorcraft in which the undercarriage can be qualified as being supercritical, as defined above.

In an aspect of the invention, the rotorcraft has connection means between the cross-member of the undercarriage and the airframe of the rotorcraft that presents angular stiffness in roll that varies, and in particular that increases, with "sinking" of the undercarriage, with the vertical speed at contact between the rotorcraft and the ground, and/or with the forces transmitted by the airframe to the cross-member (and to the undercarriage).

In a preferred embodiment, the connection means comprise first connection means which alone are active (for transmitting forces from the cross-member to the airframe) so long as the deformation of the cross-member remains below a determined level of deformation, together with second connection means that become active only when the level of cross-member deformation reaches or exceeds said predetermined level of deformation either in rolling or in vertical sinking.

In particular, said first connection means comprise one or two first parts in the form of forks or saddle portions designed to be placed astride the cross-member and to bear thereagainst, and said second connection means comprise one or two second parts (in the form of saddles or forks) designed to be placed astride the cross-member and to bear thereagainst when said predetermined level of deformation of the cross-member is reached or exceeded, the second connection means extending outside the first connection means on both sides. Advantageously, the rotorcraft may include means enabling the precise locations (along the axis of the cross-member) of the inner and/or outer connection means to be modified.

Under such circumstances in particular, the first connection means preferably further comprise a resilient band member associated with each first saddle to co-operate therewith to surround the cross-member, while allowing the cross-member to move vertically relative to the saddle and inside the saddle, as is made possible by the elastic deformation of the band member which serves to keep the undercarriage in place when the rotorcraft is in flight.

In a variant embodiment, a single part is placed astride the cross-member and presents a profile that varies along the axis of the cross-member, thereby performing the functions of said first saddle and of said second saddle. Under such circumstances, two such (substantially identical) parts are disposed on either side of a vertical antero-posterior midplane of symmetry of the undercarriage.

In other words, and in another aspect of the invention, the rotorcraft has two first connection means or inner bearing points that are close together and arranged to transmit forces from the cross-member to the airframe of the rotorcraft or vice versa, and two second connection means, or outer bearing points, arranged not to transmit forces from the cross-member to the airframe of the rotorcraft unless said forces are greater than a predetermined value (which is greater than the weight of the airframe), and thus when the impact speed against the ground is greater than a predetermined value, e.g. of the order of one meter per second.

These second connection means extend "outside" the first connection means, i.e. the distance between each second connection means and an antero-posterior midplane of the undercarriage is greater than the distance between each of the first connection means and said plane.

In an embodiment of the invention, angular stiffness in roll of the connection means when the airframe is resting on the front cross-member of the undercarriage via the inner bearing points is at least about 10% less and in particular at least about 20% or 30% less, than the angular stiffness in roll of the connection means when the airframe is resting on the undercarriage via the outer bearing points.

In another aspect of the invention, a rotorcraft is proposed combining said connection means of variable angular stiffness with an undercarriage cross-member that presents varying second moment of area.

In particular, an undercarriage is proposed in which the generally tubular cross-member (of closed profile) presents smaller second moment of area in a central portion than in two side (end) portions extending on either side of the central portion. This encourages "controlled" deformation of the cross-member, and in particular of its central portion; this increased capacity for deformation (elastic and plastic) of the cross-member serves both to reduce the (angular) stiffness in roll of the aircraft resting on its undercarriage, and also its stiffness along the vertical axis.

In an embodiment of the invention, the vertical stiffness of the connection means when the airframe is resting on the front cross-member of the undercarriage via the inner bearing points is at least about 10% less, and in particular at least about 20% or 30% less, than the vertical stiffness of the connection means when the airframe is resting on the undercarriage via the outer bearing points.

In a preferred embodiment, said second connection means, or outer bearing points, extend respectively substantially in line with two longitudinal reinforcing structures or longerons, that extend under the floor of the cabin (or airframe) of the rotorcraft, and/or that constitute the lower load-carrying structure of the rotorcraft fuselage (or "bottom structure").

The invention applies in particular to rotorcraft in which the undercarriage has a second cross-member (rear cross-member) with a (single) third connection means arranged centrally to transmit forces from the second cross-member to the airframe of the rotorcraft (and vice versa) without intervening in the stiffness in roll of the undercarriage.

BRIEF DESCRIPTION OF THE DRAWINGS

Other aspects, characteristics, and advantages of the invention appear in the following description which refers to the accompanying drawings that show, without any limiting character, preferred embodiments of the invention.

FIG. 6 is a view from behind (along arrow VI in FIG. 1) showing the two left thrust abutments of the airframe on the front cross-member of the undercarriage.

FIG. 7 is a side view of the left outer bearing point in an inactive configuration, as seen looking along arrow VII in FIG. 6.

FIG. 8 is a side view of the left inner bearing point in an active configuration and is a view as seen looking along arrow VIII-VIII of FIG. 6.

MORE DETAILED DESCRIPTION

Figure 1:
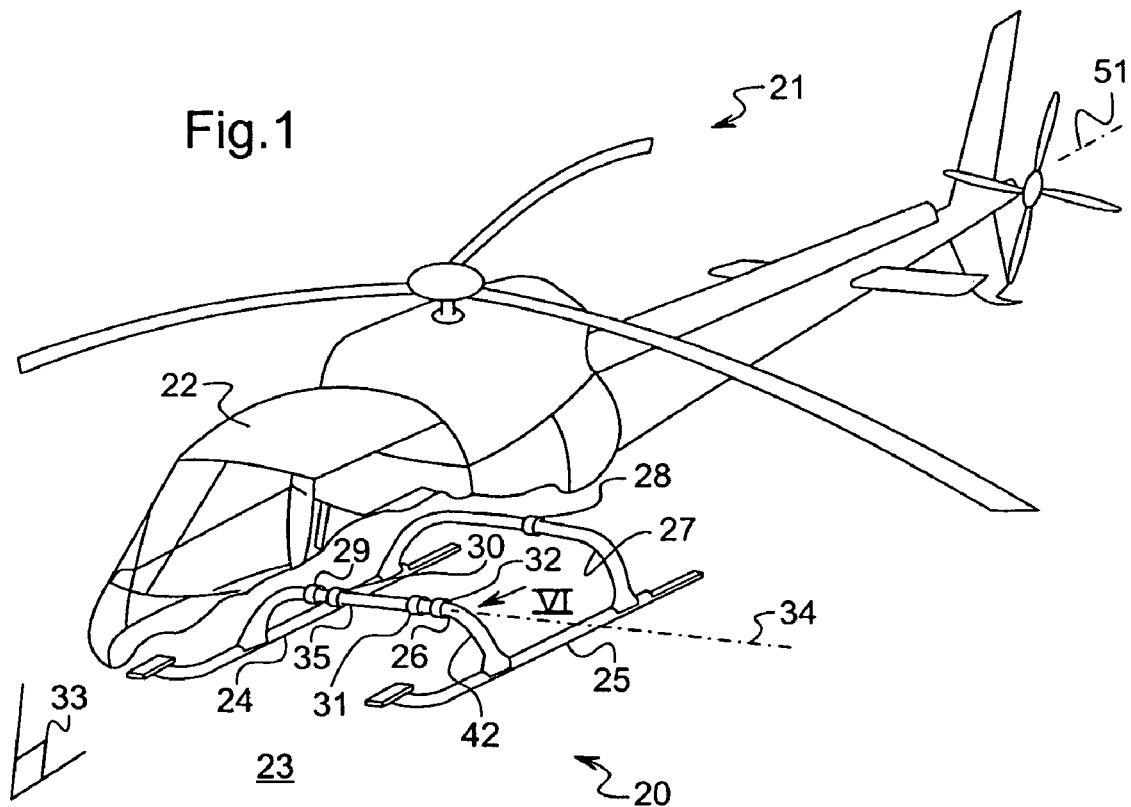
FIG. 1 is a partially cutaway diagrammatic perspective view of a helicopter and its skid undercarriage.

With reference to FIG. 1 in particular, the present invention applies specifically to a skid undercarriage 20 fitted to a helicopter 21 whose airframe 22 can rest on the ground 23 via an undercarriage.

In the meaning of the present application, the term "skid undercarriage" designates an undercarriage comprising two skids, skis, or floats given overall references 24 and 29 and that extend substantially along the longitudinal axis 51 of the rotorcraft.

The skids 24 and 25 are connected together by a front cross-member 26 and by a rear cross-member 27, each of these cross-members presenting two downwardly-curved end portions. Each outer or lateral end of the cross-members is connected to one of the skids.

Figure 2:
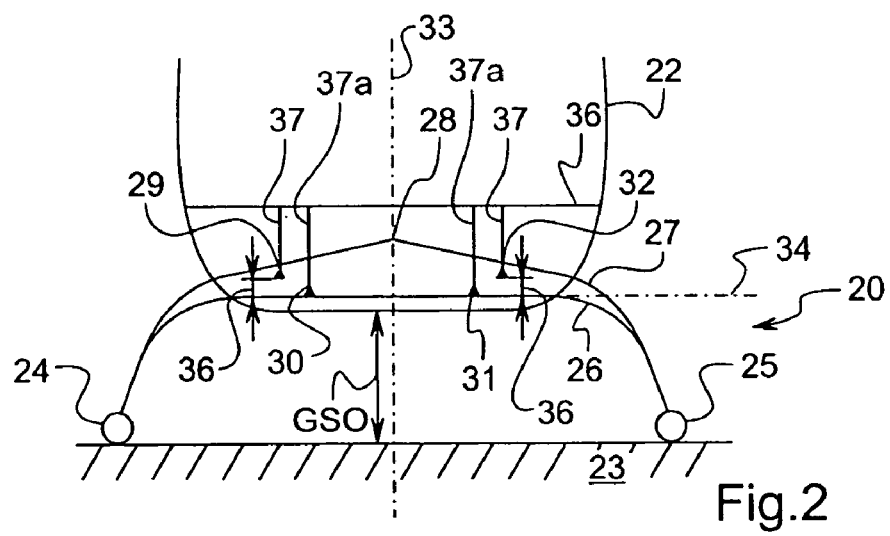
FIG. 2 is a diagrammatic and fragmentary front view showing the profile of the airframe and that of the transverse beams or cross-members of an undercarriage in a helicopter of the invention.

With reference to FIGS. 1 and 2, the rear cross-member 27 receives single connection means 28 for connection with the fuselage (airframe) of the helicopter, in a bearing zone or point located in the middle of the cross-member 27.

The front cross-member 26 receives four connection means (29 to 32) for connection with the fuselage and extending in four bearing zones or points disposed symmetrically on either side of the (vertical) antero-posterior midplane 33 of the aircraft 21 along the transverse axis 34 along which the middle portion 35 of the beam 26 extends.

In FIGS. 2 to 5, the four bearing points 29 to 32 respectively connecting the front cross-member 26 to four longerons 37, 37a supporting the floor 36 of the airframe 22 are symbolized by black triangles, each longeron being symbolized by a vertical line and the front cross-member being represented by a continuous curvilinear line representing its neutral fiber.

The term "sinking" of the undercarriage 20 is used to designate the difference between the ground clearance at rest GSO (FIG. 2) and the ground clearance GS (FIGS. 3 to 5) as reduced, in particular while landing.

Figure 10:
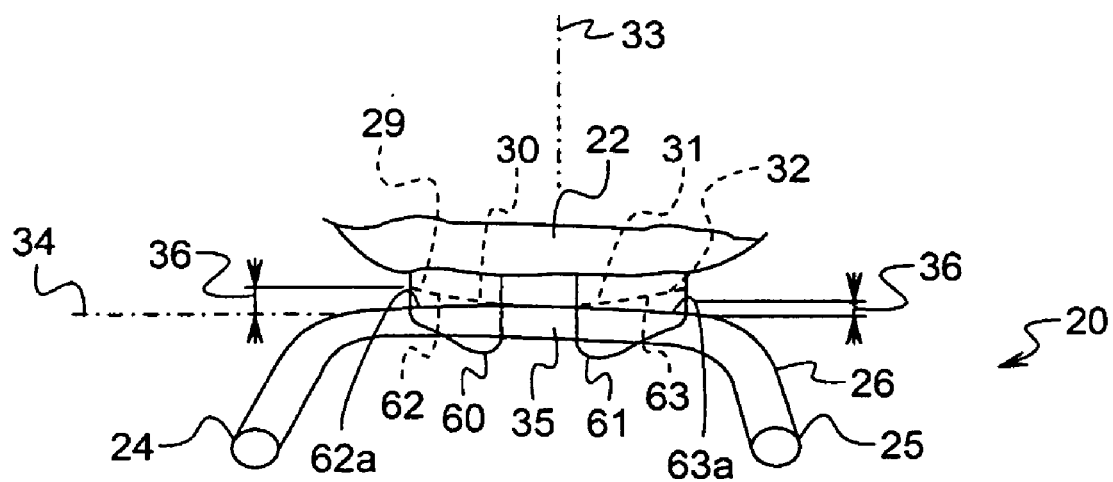
FIG. 10 is a diagrammatic face of a variant embodiment of the (variable stiffness) connection means between the fuselage and the undercarriage of a rotorcraft of the invention.

With reference to FIGS. 1, 2, and 10, in particular, when the aircraft is standing on the ground and its rotor is stationary, part of its weight is transmitted to the central portion 35 of the cross-member 26 by the two close-together bearing points 30 and 31, and part is transmitted to the rear cross-member 27. In this configuration, the two outer lateral bearing points 29 and 32 are separated from the corresponding bearing zone of the cross-member 26 by a distance 36 that is of the order of several millimeters, for example.

Figure 4:
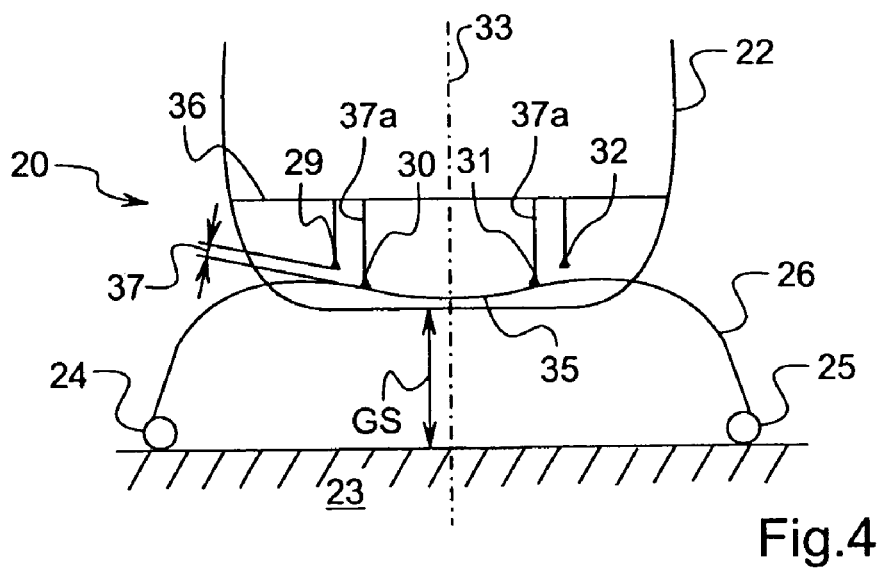
Figure 9:
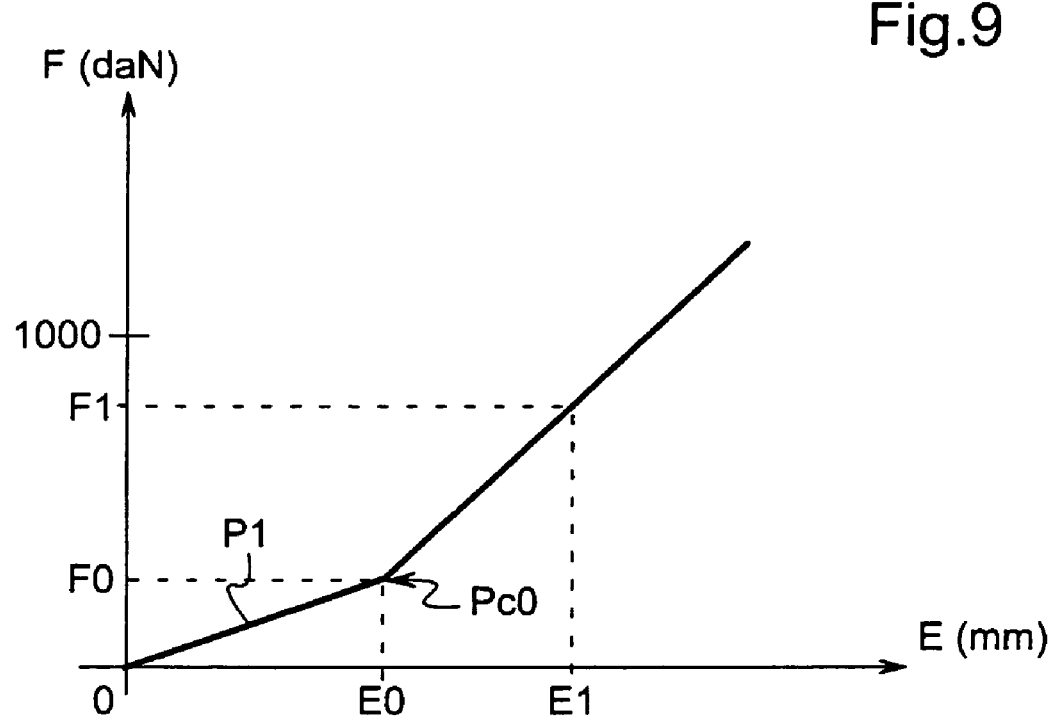
FIG. 9 is a graph showing variation in the amount of sinking E, plotted along the abscissa, for an undercarriage of the invention, as a function of the magnitude of the force F transmitted between the airframe and the undercarriage, plotted up the ordinate, for symmetrical vertical loading.

This distance is selected to avoid contact between the bearing points 29, 32 and the facing portions of the cross-member 26, even when the cross-member 26 is subjected to deformation as a result of landing with non-zero vertical speed that is lower than a determined value, corresponding to the illustration of FIG. 4. In this configuration with little sinking, the central portion 35 of the cross-member 26 sags, but clearance 37 remains between the outer lateral abutments 29, 32 and the cross-member. In FIG. 9, this configuration corresponds to a point P1 of the graph at which the degree of sinking E is less than a value E0, and for which the force transmitted between the airframe and the undercarriage is less than the value F0.

Figure 3:
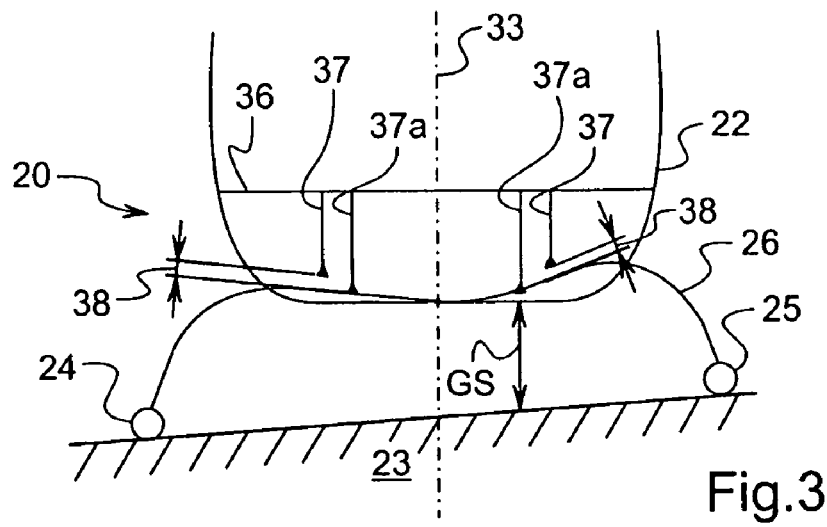
FIGS. 3 to 5 are similar to FIG. 2 showing the deformation profile of the front cross-member of an undercarriage of the invention in three distinct configurations: during rolling movement of the helicopter standing on the ground (FIG. 3); while landing at low vertical speed (FIG. 4); and while landing at high vertical speed (FIG. 5).

In the (small) roll configuration shown in FIG. 3, where the undercarriage is loaded asymmetrically (relative to the plane 33), clearance 38 likewise remains between the outer bearing points and the cross-member 26.

Figure 5:
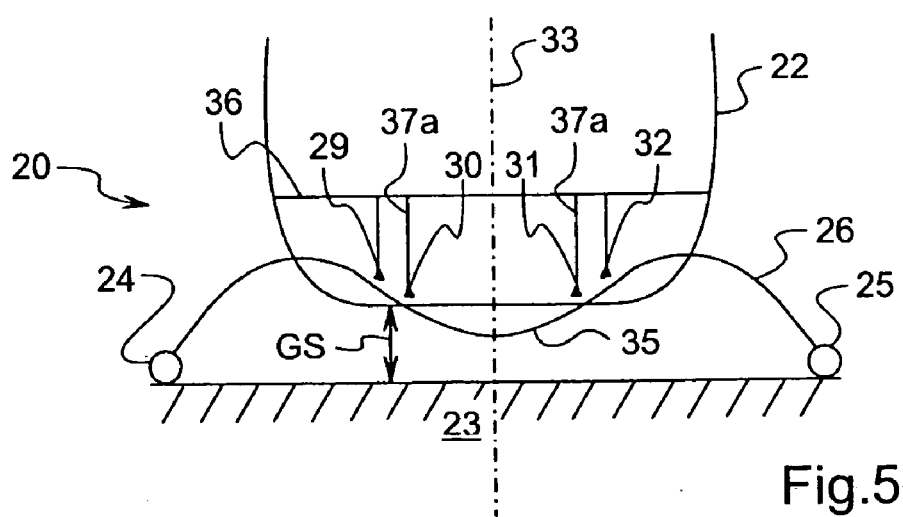

For a high landing speed, the deformation of the cross-member 26 is sufficient to lead to contact between its top face and the outer lateral abutments 29 and 32, as shown in FIG. 5: this corresponds (cf. FIG. 9) to a transmitted force F1 greater than the value F0 and to a degree of sinking E1 greater than E0.

The spacing between the outer bearing points 29 and 32 is greater that the spacing between the "close-together" or inner bearing points 30 and 31, so when the sinking E reaches (and exceeds) the value E0 at which the bearing points 29 and 32 come into contact with the cross-member, there is an increase in the vertical stiffness and in the stiffness in roll of the connection between the undercarriage and the fuselage: the increase in stiffness along a vertical axis corresponds (cf. FIG. 9) to the increase in the slope of the graph as from point PC0. This point corresponds to the force F0 and to the sinking E0 that are sufficient to cause the lateral abutments 29, 32 to make contact with the central portion of the cross-member.

By way of example, the angular stiffness of the connection via the close-together bearing points may be about $2\times10^5$ newton meters per radian (Nm/rad), whereas the angular stiffness via the outer bearing points is of the order of $4\times10^5$ Nm/rad. The stiffness in translation along the vertical axis may be about $7\times10^4$ newtons per meter (N/m) for the close-together bearing points, and about $1\times10^5$ N/m for the outer bearing points.

This operation is facilitated by using a central portion 35 of the cross-member that presents a second moment of area that is smaller than that of the end portions of the same cross-member. In the embodiment shown in FIG. 6, the diameter 40 of the central tubular portion 35 is thus smaller than the diameter 41 of the end portion 42 of the cross-member that extends the central portion beyond the outer bearing point 32.

Figure 6:
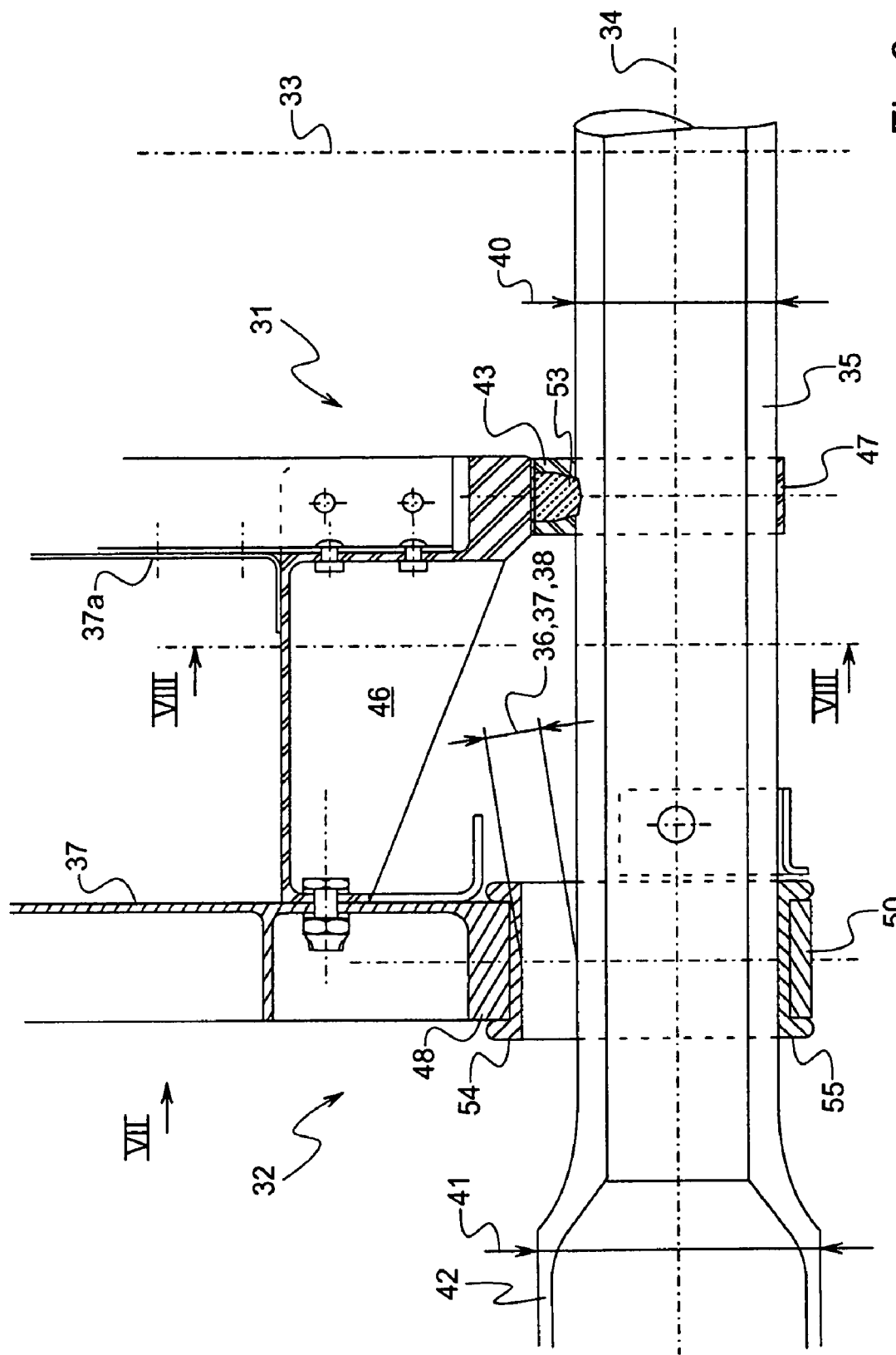
FIGS. 6 to 8 are detail views of a preferred embodiment of connection means between the bottom structure of the fuselage and the front cross-member of an undercarriage of the invention.
Figure 8:
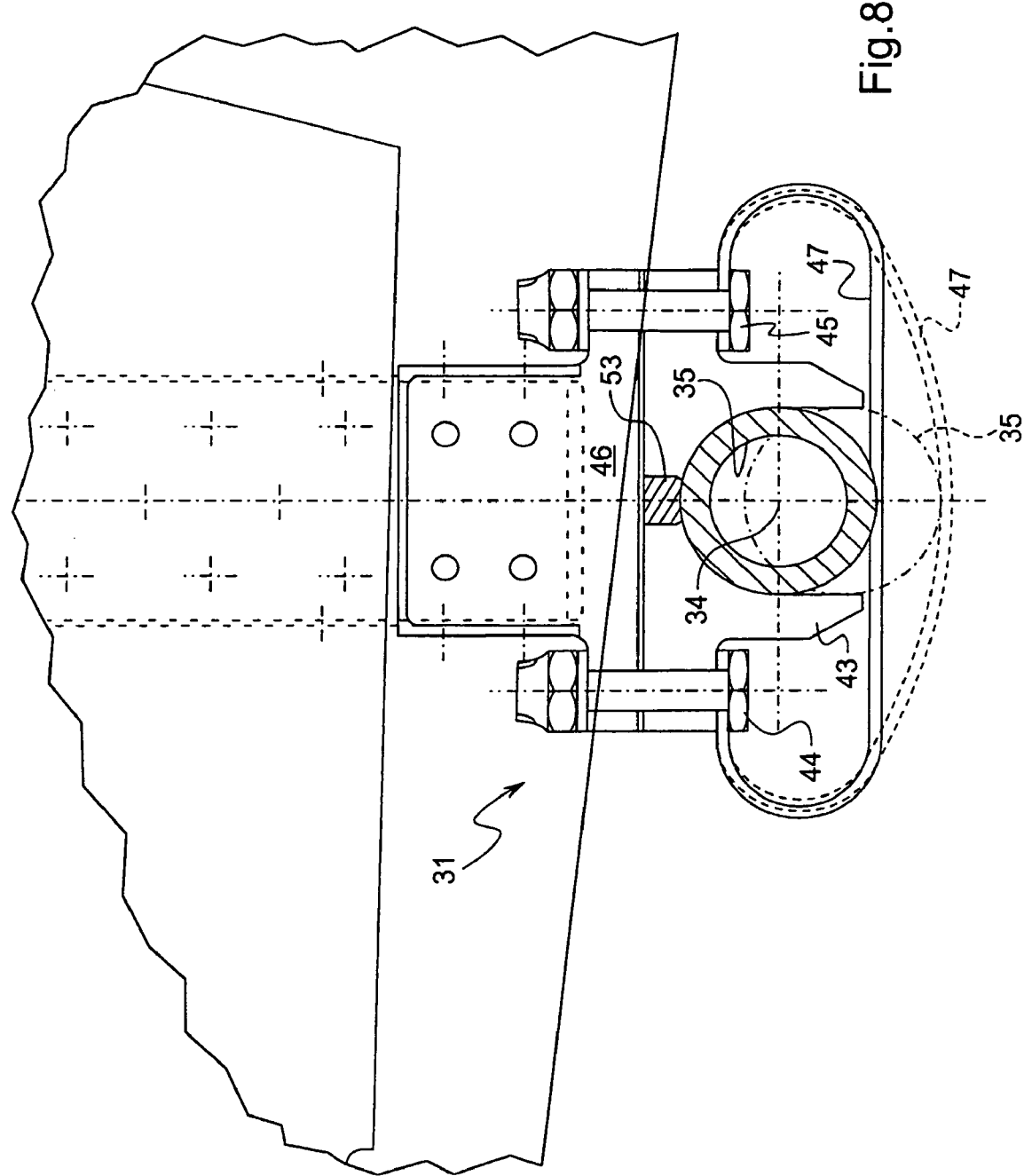

With reference to FIGS. 6 and 8, the inner bearing point forming part of the first connection means 31 is implemented by a fork 43 astride the tube 35. The fork is secured by two bolts 44, 45 to a bracket 46 connecting a main longeron 37 of the airframe floor to a secondary longeron 37a under which the fork 43 extends.

These bolts 44, 45 also secure the airframe to a resilient blade 47 holding the cross-member 35 engaged in the fork 43 even in the event of deformation of the cross-member causing bearing contact between these two parts to be interrupted, as shown by the dashed line configuration in FIG. 8.

Figure 7:
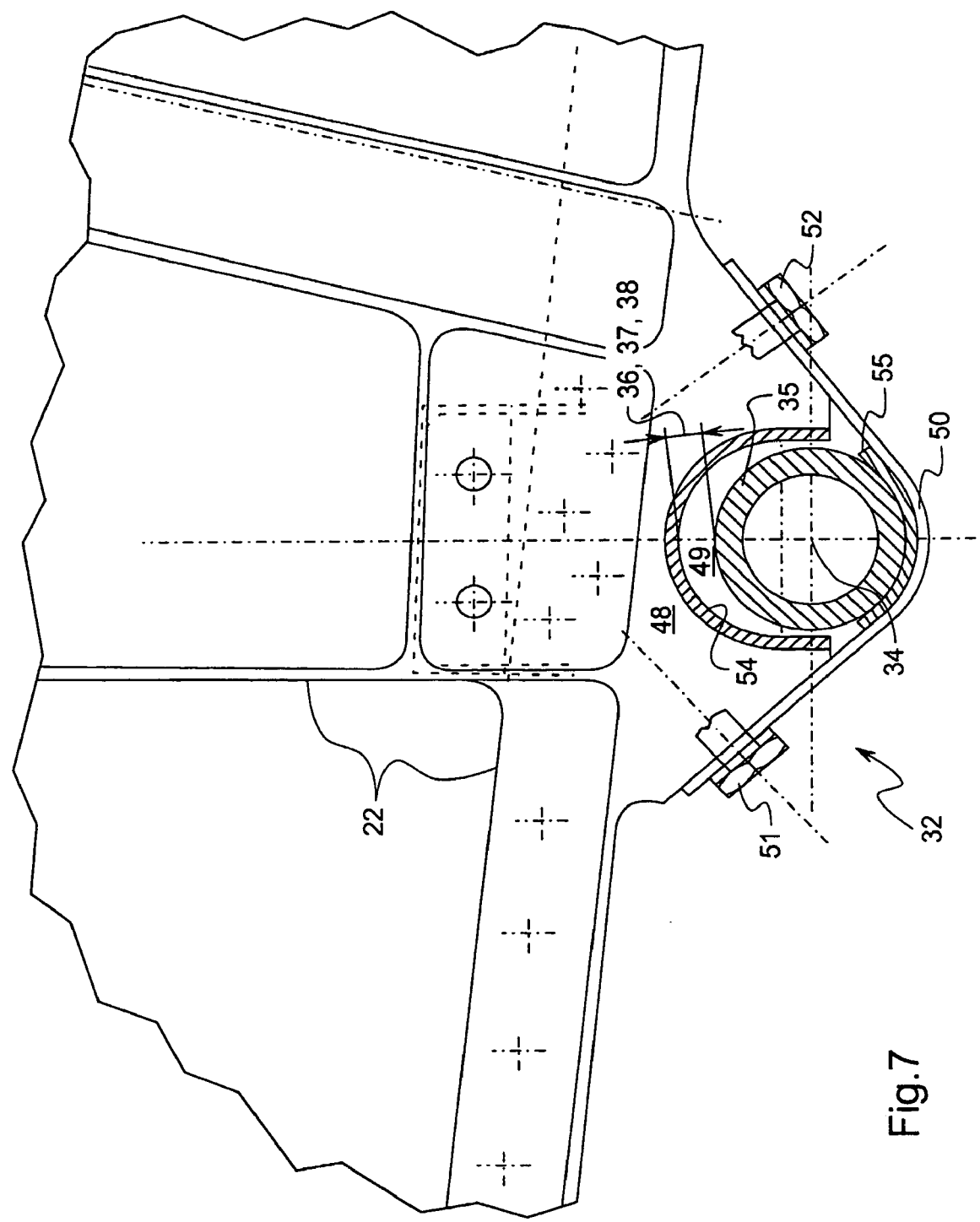

With reference to FIGS. 6 and 7, the outer bearing portion 32 forming part of the second connection means is also made in the form of a fork 48 defining a cavity 49 over the cross-member 35, while allowing said clearance or distance 36 to 38 (as shown in FIGS. 2 to 4) to remain so long as the deformation of the cross-member is not sufficient to cause the cross-member to bear against the fork 48 at the bottom of the cavity 49.

In a manner similar to that provided for the inner bearing point 31, the structure of the outer bearing portion 32 likewise includes a blade 50 connected to the fork by two bolts 51, 52 and co-operating with the fork to surround the transverse end of the portion 35 of the cross-member that presents the smaller second moment of area.

As shown in FIGS. 6 to 8, spacers or flexible damping coatings 53 to 55, e.g. made of elastomer, are provided in the zones of contact between the cross-member and the forks and the blades that come to bear thereagainst.

As shown in FIG. 6 in particular, the secondary longeron 37a for taking up the forces transmitted by the inner bearing point 31 may present thickness and/or mechanical strength smaller than that of the main longeron 37 that is for taking up the forces transmitted by the outer bearing point 32.

With reference to FIG. 10, the means for transmitting force between the undercarriage and the fuselage comprise two identical saddles 60 and 61 placed symmetrically about the plane 33. Each saddle presents a bearing surface 62, 63 that bears against the central portion 35 of the cross-member 26 and that extends along a transverse profile that is oblique relative to the transverse profile 62a, 63a of the corresponding portion of the cross-member. Thus, the inner portion of each saddle 60, 61 forms the "inner" bearing point 30, 31, while the outer portion of each saddle 60, 61 forms the outer bearing point 29, 32.

The invention makes it possible to control the rolling behavior of the rotorcraft in contact with the ground and to improve its stability in ground resonance; the invention can be applied to existing aircraft in simple manner and without significant increase in weight.

The invention makes it possible to achieve the desirable mode of rolling for a helicopter for which the first rotor drag mode is less than or equal to $\Omega/2$, for behavior that is supercritical in ground resonance, thereby eliminating any risk of resonance in the event of the roll inertia of the aircraft increasing subsequent to its design. Control over ground resonance is thus integrated in the undercarriage without it being necessary to add mechanical members having stiffness and damping characteristics that are liable to vary over time or with temperature, for example, and without requiring any members to be added that require special maintenance.

The invention makes it possible to reduce the usual stiffness of skid undercarriages for landings under small load and/or speed.

The disposition of the connection means makes it possible in particular to adjust independently the angular stiffness in roll when the aircraft is at rest on the ground, for the purpose of avoiding ground resonance, and the vertical and roll stiffness while the aircraft is landing, so as to give it better landing characteristics.

What is claimed is:

1. A rotorcraft (21) having a antero-posterior midplane (33) and a transverse axis (34) arranged perpendicular to each other, comprising:
    a fuselage (22) and a skid undercarriage (20) having skids (24, 25) interconnected by a first cross-member (26) and a second cross-member (27);
    first and second connection means for connecting the first cross-member to the fuselage; and
    third connection means (28) for transmitting forces from the second cross-member to the fuselage and vice versa,
    wherein said first connection means (30, 31) comprise two first parts bearing against the first cross-member (26), said first connection means alone transmitting forces from the first cross-member (26) to the fuselage so long as the deformation of the first cross-member (26) remains less than a determined non-zero level of deformation in rolling or in vertical sinking, said two first parts being spaced apart along a length of the first cross-member on opposite sides of the antero-posterior midplane of the rotorcraft, and
    wherein said second connection means (29, 32) comprise two second parts that are spaced from the first cross-member (26) until said determined non-zero level of deformation of the cross-member is reached or exceeded, said two second parts bearing against the first cross-member only when the deformation of the first cross-member (26) reaches or exceeds said determined non-zero level of deformation, said two second parts being spaced apart along the length of the first cross-member on opposite sides of the antero-posterior midplane farther from the antero-posterior midplane than respective ones of said two first parts.

2. A rotorcraft according to claim 1, wherein the second connection means present angular stiffness in roll that increases with increasing sinking (E) of the undercarriage as a result of contact with the ground (23).

3. A rotorcraft according to claim 1, wherein each of said two first parts of the first connection means straddles the first cross-member.

4. A rotorcraft according to claim 3, wherein each of said two first parts further comprises a resilient blade that cooperates therewith to surround the first cross-member.

5. A rotorcraft according to claim 1, wherein each of said two second parts of the second connection means straddles the first cross-member.

6. A rotorcraft according to claim 1, wherein said two first parts and said two second parts are disposed symmetrically relative to the antero-posterior midplane.

7. A rotorcraft according to claim 1, wherein an angular stiffness in roll of the first connection means when the fuselage is resting on the first cross-member (26) of the undercarriage via the first connection means (30, 31) is at least about 10% less than the angular stiffness in roll of the second connection means when the fuselage is resting on the first cross-member of the undercarriage via the second connection means (29, 32).

8. A rotorcraft according to claim 1, in which the first cross-member (26) presents a second moment of area that varies along its length.

9. A rotorcraft according to claim 8, wherein the second moment of area of the first cross-member (26) is smaller in a central portion than in two lateral portions extending on either side of the central portion.

10. A rotorcraft according to claim 1, in which the first cross-member is tubular.

11. A rotorcraft according to claim 1, wherein a vertical stiffness along the vertical axis (33) of the first connection means when the fuselage is resting on the undercarriage via the first connection means (30, 31) is at least about 10% less than a vertical stiffness of the second connection means when the fuselage is resting on the undercarriage via the second connection means (29, 32).

12. A rotorcraft according to claim 1, in which said second connection means extend respectively substantially in line with two longitudinal reinforcing structures (37) forming part of the bottom structure of the fuselage.

13. A rotorcraft according to claim 1, wherein the undercarriage has a resonant frequency in rolling, $\omega x$, that is less than the absolute value of the difference between nominal $\Omega$ and $\omega\delta$:

$$\omega x < |\Omega - \omega\delta|,$$

$\Omega$ is a frequency of rotation of the at least one rotor, and
$\omega\delta$ is a frequency of oscillation in drag of the at least one blades of the at least one rotor.

14. A rotorcraft according to claim 1, further comprising means for adjusting along the length of the first cross-member (26) the positions of the first connection means and the second connection means.

15. A rotorcraft according to claim 1, wherein said third connection means comprises a single connection to the fuselage at a middle of the second cross-member.

16. A rotorcraft according to claim 1, wherein the first cross-member is a front cross-member extending in front of the second cross-member, which is a rear cross-member.

* * * * *